No. 722,178. PATENTED MAR. 3, 1903.
J. P. HOWARD.
FASTENING DEVICE FOR FURNITURE MEMBERS.
APPLICATION FILED SEPT. 28, 1901.
NO MODEL. 2 SHEETS—SHEET 1.
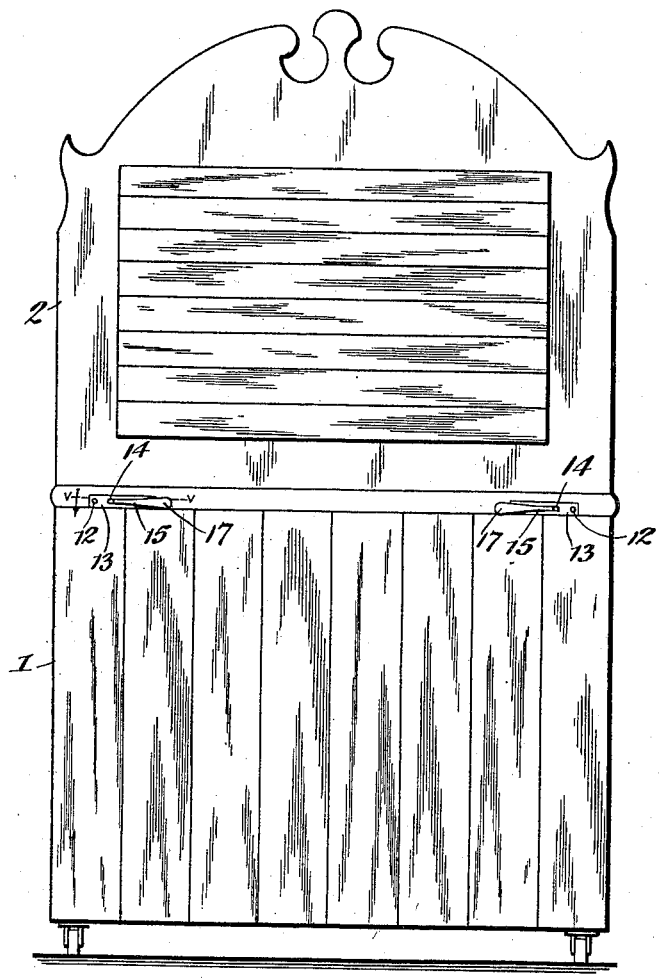
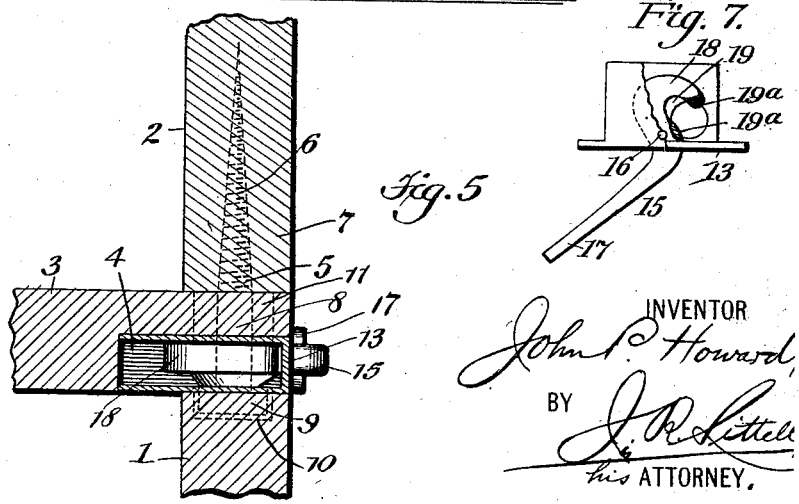
WITNESSES:
INVENTOR
John P. Howard,
BY
his ATTORNEY.

No. 722,178. PATENTED MAR. 3, 1903.
J. P. HOWARD.
FASTENING DEVICE FOR FURNITURE MEMBERS.
APPLICATION FILED SEPT. 28, 1901.
NO MODEL. 2 SHEETS—SHEET 2.
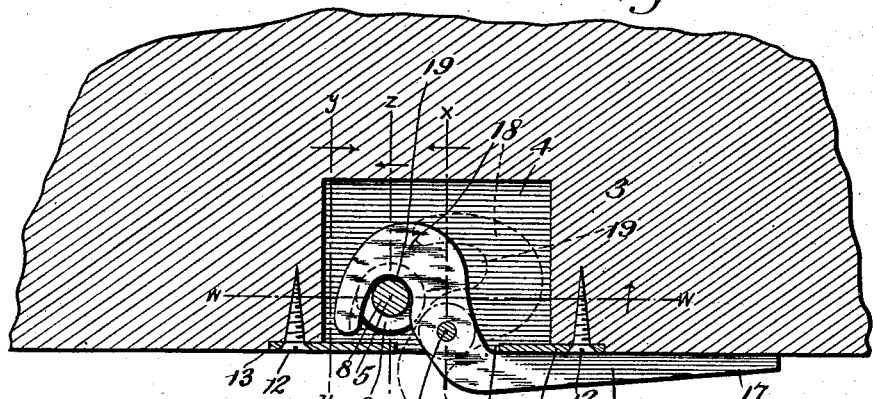
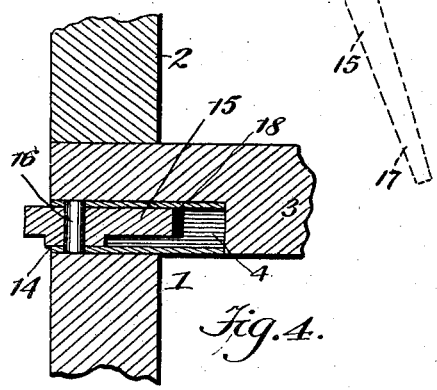
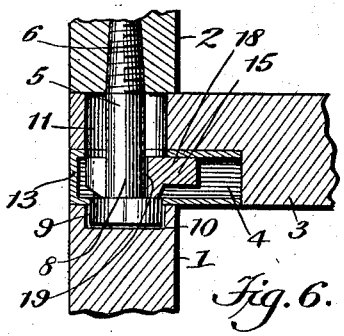
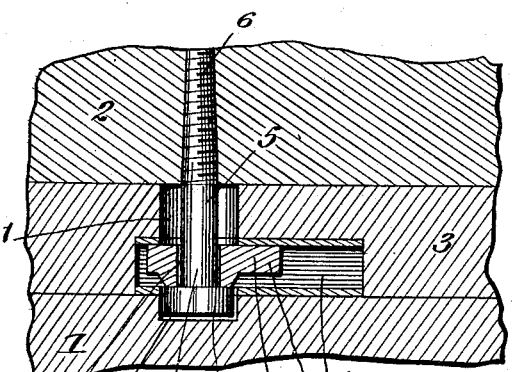
WITNESSES:
INVENTOR
John P. Howard,
BY
his ATTORNEY.

UNITED STATES PATENT OFFICE.

JOHN P. HOWARD, OF NEW YORK, N. Y., ASSIGNOR OF THREE-FOURTHS TO OWEN H. MANNES AND LEONARD MANNES, OF NEW YORK, N. Y., AND ROBERT W. IRWIN, OF GRAND RAPIDS, MICHIGAN.

FASTENING DEVICE FOR FURNITURE MEMBERS.

SPECIFICATION forming part of Letters Patent No. 722,178, dated March 3, 1903.

Application filed September 28, 1901. Serial No. 76,932. (No model.)

*To all whom it may concern:*

Be it known that I, JOHN P. HOWARD, a citizen of the United States, residing at New York, in the county of New York and State of New York, have invented certain new and useful Improvements in Fastening Devices for Attaching Furniture Members, of which the following is a specification.

This invention relates to fastening devices for attaching furniture members; and it has particular relation to an improved fastening means whereby the mirror members of the bodies of dressers, bureaus, and similar articles of furniture may be conveniently and securely connected with and attached to and securely mounted in operative position with relation to the body member of such articles of furniture.

Usually in the mounting of mirrors upon the bodies of dressers and similar articles of furniture the mirror is fastened by simple cleats, which extend across the joint between the furniture members and are secured by screws entering the respective members. This means of fastening requires considerable time for attachment and is therefore comparatively expensive, and it does not form a secure and positive fastening, inasmuch as the mirror is liable in operation to work loose and have an undesirable tilt or movement from its true position.

The object of my invention is to provide a simple and improved fastening means which will be inexpensive in construction and can be quickly and readily operated to securely connect the furniture members and positively and firmly maintain the same in proper relative position.

Inasmuch as such articles of furniture are sometimes frequently moved or transported and it is usually necessary to separate the mirror and body for such transportation, it is of course very desirable to be able to accomplish this separation quickly and effectively, and my invention enables a rapid and convenient separation or connection of said furniture members.

While I have herein shown and described my invention in its specific application to a bureau or dresser, it will be understood that it is adapted for a variety of general applications for the purpose of connecting and fastening members upon various other types of articles of furniture.

In the drawings forming a part of this specification, Figure 1 is a rear view of a dresser provided with my invention. Fig. 2 is a detail horizontal sectional view taken on the line *v v*, Fig. 1. Fig. 3 is a detail vertical sectional view taken on a longitudinal plane on the line *w w*, Fig. 2. Fig. 4 is a detail vertical sectional view taken on the line *x x*, Fig. 2. Fig. 5 is a detail vertical sectional view taken on the line *y y*, Fig. 2. Fig. 6 is a detail vertical sectional view taken on the line *z z*, Fig. 2. Fig. 7 is a detail inverted plan view showing the under surface of the cam-lever.

Corresponding parts in all the figures are denoted by the same numerals of reference.

Referring to the drawings, 1 designates the body member, and 2 the mirror member. In the top 3 of the member 1 is provided a recess 4 for the accommodation of the operating parts of my improved fastening device.

5 designates a screw, the threaded portion 6 of which is inserted upwardly into the lower edge 7 of the member 2, while the stem or shank 8 of said screw extends downwardly in the recess 4 and carries a head 9, which is suitably accommodated in a recess 10, provided in the member 1. The recess 4 at the point of location of the screw 5 is extended vertically, as at 11, through the top 3 to permit of the downward passage of the screw-head 9 when the members 1 and 2 are placed in relative position.

Secured at the back of the top member 3 by screws, as at 12, or other suitable fastening means is a plate 13, which is slotted on a longitudinal plane, as at 14.

15 designates a cam-lever, which operates in the recess 4 and in the slot 14 of the front plate 13, said lever being fulcrumed, as at 16. The lever is provided with an operating-handle 17, preferably flat, as shown, and projecting outside the front plate 13, and with an inner cam-shaped portion 18, which projects into the recess 4. The inner cam-shaped portion 18 of the lever is provided with a slot or recess 19, which describes a movement in a segmental plane in the operation of the lever and is adapted to receive the stem of the screw-bolt 5 and embrace or inclose the stem at opposite sides. The lower face of the inner cam-shaped portion 18 of the lever 15 is adapted to bear against the head of the screw 5. The lever 15 at the open end of the slot or recess 19 has the walls of such slot 19 rounded outward to facilitate the entrance of the stem of the screw 5, and the lower face of the lever 15, adjoining such slot 19, is inclined to engage the head of said screw 5 and draw the members 1 and 2 together tightly. The inclined or beveled portions of the lower face of the inner cam portion 18 of the lever 15 are at both sides the initial end of the slot or recess 19, as shown at 19ª, so that they will ride over the head of the screw-bolt at opposite sides of the stem, and a strong bearing against the head of the screw-bolt at opposite sides of the stem is insured. Beyond the inclined or beveled initial portion (which is the cam portion of the lever) the under face of the lever portion 18 is preferably flat, whereby the lever would thus have a flat, positive, and direct bearing against the head of the screw-bolt and at opposite sides of the stem when the lever is in operative locking position, which flat bearing insures against accidental release of the clamping operation of the lever by sliding down over the initial inclined or beveled portion.

The operation and advantages of my invention will be readily understood by those skilled in the art to which it appertains. When the furniture member 2 is provided with the headed screw-bolt 5 and the furniture member 1 is provided with cam-lever devices, hereinabove described, it is only necessary to set the lower edge of the member 2 in position so that it rests upon the top 3 of the member 1, in which placing of the furniture parts in position the head and stem of the screw-bolt 5 will pass downwardly through the recesses in the top 3 of the member 1. During the setting of the furniture members, as just described, the cam-lever is thrown outwardly to the position illustrated in dotted lines in Fig. 2, which will carry the slot 19 rearwardly beyond the plane of the passage of the head of the screw-bolt. It is then only necessary to turn the cam-lever inwardly to the position illustrated in full lines in Fig. 2, which operation will cause the slot 19 to embrace the stem of the screw-bolt, and the lever will bear downwardly against the head of the latter at both sides the stem of the screw-bolt, thus maintaining the furniture member 2 positively and securely in connection with the furniture member 1. To separate the members 1 and 2, it is only necessary to reverse the operation as above described.

It will be noted that the slot 19 formation of the lever 15, whereby the stem or shank of the screw-bolt is embraced at opposite sides, provides a firm and very effective bearing upon the head of the screw-bolt. It will also be noted that the relative arrangement and construction of parts is such that a securely locked contact or engagement is formed when the parts are in operative position and accidental movement of the lever from its operative engagement with the head of the screw-bolt is prevented. It will be understood that the screw-bolt may be so adjusted to regulate the position of its head with relation to the bearing operation of the lever that a tight joint between the furniture members 2 and 1 will be insured under all conditions.

I do not desire to be understood as limiting myself to the precise details of construction and arrangement as herein shown and described, as manifest variations and modifications may be made without departing from the spirit and scope of my invention and improvements. I therefore reserve the right to all such variation and modification as properly falls within the scope of my invention and the terms of the following claims.

Having thus described my invention, I claim and desire to secure by Letters Patent—

1. As an improvement in fastening devices of the class described, the combination, with the case furniture-body member having a vertical and horizontal recess in its horizontal top piece or portion, of the detachable vertical back piece or mirror member the lower edge of which rests upon the horizontal top portion of the body member, said vertical top member being provided with an adjustable screw-bolt projecting downwardly from its lower edge and received by the vertical portion of the recess in the top of the body member and having a head upon said projecting portion, and a member operating in the horizontal portion of the recess in the top of the body member and having means for effecting a clamping or cam action upon the head of the screw-bolt, for the purpose set forth.

2. As an improvement in fastening devices of the class described, the combination, with the furniture-body member having a recess in its horizontal top piece or portion, of the detachable vertical back piece or furniture top member the lower edge of which rests upon the horizontal top portion of the body member, said top member being provided with a screw-bolt projecting downwardly from its lower edge and received by the recess in the top of the body member and having a head upon said projecting portion, and clamping or cam means carried by the body member and straddling the stem of the screw-bolt and bearing upon the head of the same at opposite sides of the stem.

3. As an improvement in fastening devices of the class described, the combination, with the furniture-body member having a recess in its top portion, of the detachable member the edge of which abuts against the recessed portion of the body member, said detachable member being provided with a projecting member extending from said abutting edge and received by the recess in the body member and having a headed stem portion, and a lever carried by the body member and having a recessed or open-slotted inner portion which is beveled or cam-shaped at the side portion of the slot or recess and straddles or embraces the stem of said projecting member upon the detachable member and bears upon the head of said projecting member at opposite sides of the stem.

4. As an improved article of manufacture, a device for detachably connecting a furniture-body member and a detachable furniture member the edge of which abuts against the body member comprising a projecting member on the abutting edge of the detachable member consisting of a screw-bolt having a head upon its projecting end, and a clamping or cam member adapted for carriage by the body member and consisting of a lever having a recessed or open-slotted portion which is beveled or cam-shaped at the side portion of the slot or recess, to straddle or embrace the stem of the screw-bolt and bear upon the head thereof at opposite sides of the stem.

5. Means for attaching a mirror to a dresser, said dresser having slots in the top thereof, pivoted levers seated in said slots, said levers being beveled on their under sides and having open slots, the dresser-case also having holes passing through the top thereof, and headed screws closely fitting such holes, said holes leading into the slots in the dresser-case, and the necks of the screws being engaged by the slots in said levers.

6. The combination with the top of a dresser-case having a slot therein, of a hook-lever pivoted in said slot, said lever having an open slot therein, a screw permanently engaging the mirror-frame and provided with a head adapted to closely fit within the slot in the dresser-top, said hooked lever adapted to swing in the slot of the dresser and the open slot thereof engage the neck of the screw when the lever is swung in the slot of the dresser.

In testimony whereof I have signed my name in the presence of the subscribing witnesses.

JOHN P. HOWARD.

Witnesses:
J. R. LITTELL,
JONAS B. WEIL.